United States Patent [19]

Miyake et al.

[11] Patent Number: 5,085,416
[45] Date of Patent: Feb. 4, 1992

[54] STERILIZED FOOD CUTTING BOARD

[75] Inventors: Teruyoshi Miyake; Tatuo Yamamoto, both of Tokyo, Japan

[73] Assignees: Chyugoku Paalu Distributing Corporation; Shinanen New Ceramic Corporation; Shinagawa Fuel Co., Ltd., all of Tokyo, Japan

[21] Appl. No.: 496,676

[22] Filed: Mar. 21, 1990

[30] Foreign Application Priority Data

Dec. 27, 1989 [JP] Japan .................................. 1-338948

[51] Int. Cl.$^5$ .............................................. B23Q 3/00
[52] U.S. Cl. .................. 269/289 R; 269/286
[58] Field of Search ................ 427/212; 428/903, 328; 423/112, 118, 328, 330; 269/289 R, 301.1, 286

[56] References Cited

U.S. PATENT DOCUMENTS 3,947,012 3/1976 Cobb .............................. 269/289 R
4,959,268 9/1990 Hagiwara et al. ................... 427/212

Primary Examiner—Robert C. Watson
Attorney, Agent, or Firm—Bauer & Schaffer

[57] ABSTRACT

A sterilized cooking board comprises a base board and an organic polymer layer containing an antibacterial zeolite and formed on the entirety of at least one surface of the base board in an upheaval shape.

4 Claims, 2 Drawing Sheets

STERILIZED FOOD CUTTING BOARD

BACKGROUND OF THE INVENTION

The present invention relates to a cooking board such as a cutting board, cheese board or cake rack, and, more particularly, to a sterilized cooking board which can keep its top portion in a sterilized state on a semipermanent base.

Since food is generally placed on a cooking board and is cut by a knife or the like, particular attention should be paid to sanitary conditions for the board.

The essential conditions for cooking boards include the water resisting property of the board's top portion, the proper hardness rigid but soft enough to prevent nicking or braking of a blade, a hard stained property and a lye free property. Cooking boards are made of a wooden material, such as *Magnolia hypoleuca,* gingko, willow, or hinoki (white cedar), or typically made of a synthesized material, such as nitrile butadiene rubber (NBR) or polyethylene butadiene rubber. Cuts are generally made on a cooking board and their number gradually increases as it is used, so that juices of food easily soak through the cuts into the board. With such juices as nutrition, bacteria are likely to breed and propagate. Many difficulties therefore arise in providing sanitized use of cooking boards, such as sufficient cleaning, sterilization, etc. to meet the proper sanitary control after actual use of the boards.

As a solution to this problem, there has been proposed a cooking board having an antibacterial ion containing zeolite (so-called antibacterial zeolite) kneaded therein which is highly safe for human bodies (refer to Unexamined Published Japanese utility Model Application Serial No. 62-201600).

Unlike conventionally used germicides or bactericide, an antibacterial zeolite is an excellent bactericide in that its antibacterial material will not be dissolved and come out or be vaporized, so that it hardly alters the taste of food or is hardly virulent. Further, the sterilized effect of the antibacterial material will last longer.

In processing this antibacterial zeolite into a cooking board, however, if it is simply kneaded in a resin such as polyethylene, a small amount of the antibacterial zeolite exists merely in a part of the surface of the cooking board to present the sterilization effect, but most of it is in the resin and does not contribute to the sterilization effect at all.

SUMMARY OF THE INVENTION

Accordingly, it is an object of this invention to provide a sterilized cooking board which can present a sufficient antibacterial property with a relatively small amount of an antibacterial zeolite and can be fabricated using substantially the same method for producing conventional cooking boards.

To achieve this object, there is provided a sterilized cooking board comprising a base board and an organic polymer layer containing an antibacterial zeolite and formed on the entirety of at least one surface of the base board in an upheaval shape.

DESCRIPTION OF THE PREFERRED EMBODIMENT

Figure 1:
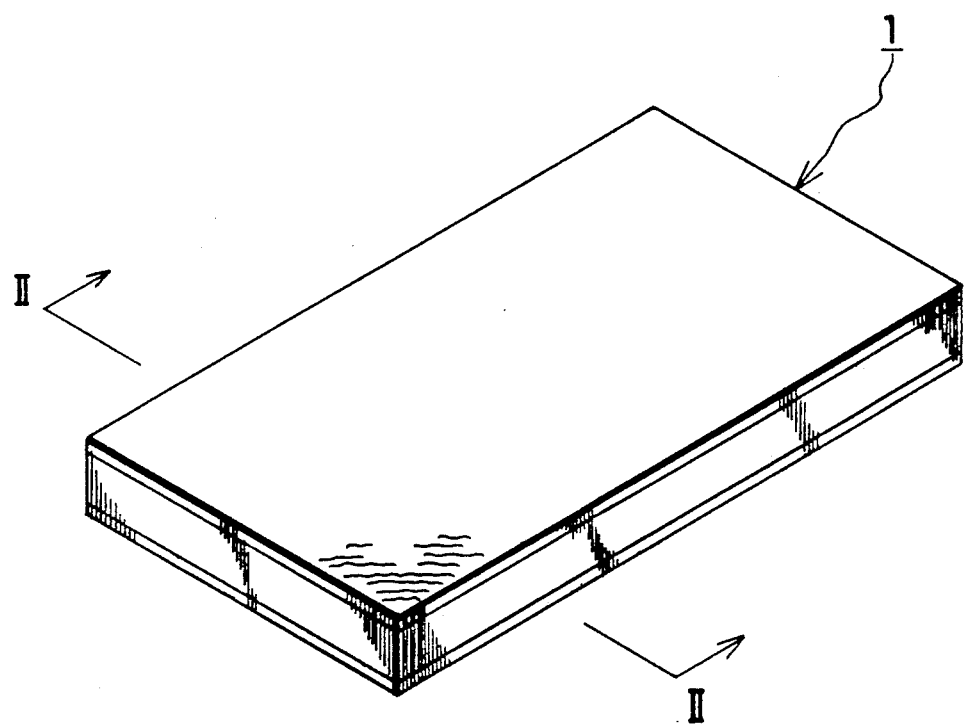
FIG. 1 is a perspective view illustrating a sterilized cooking board embodying this invention.

A sterilized cooking board according to this invention can be provided by forming an organic polymer layer containing about 3 mm or more of an antibacterial zeolite on the entire top and bottom surfaces of a cooking board or all over the board, and making the top and bottom surfaces with upheavals in the form of a rugose finish, i.e. a rough surface having many ridges, wrinkles, or creases.

An "antibacterial zeolite" used in this invention has a part or all of exchangeable ions in a zeolite exchanged with an antibacterial ion. Such an antibacterial ion may be a silver ion, copper ion, or zinc ion, for example. Alternately, the antibacterial zeolite may be a zeolite having an ion exchanged with an ammonium ion in order to prevent discoloration of resin with time.

The zeolite can be a natural zeolite or a synthesized one. Zeolite in general is an aluminosilicate having a three dimensional skeleton structure, and is generally expressed by $XM_{2/n}O.Al_2O_3.YS_iO_2.ZH_2O$, where M is an exchangeable ion which is normally a univalent or bivalent metal ion, n is the valence of the (metal) ion, X and Y are a metal oxide and silica coefficient, and Z is the number of crystal water. Practical examples of the zeolite may include an A-type zeolite, X-type zeolite, Y-type zeolite, T-type zeolite, high silica zeolite, sodalite, mordenite, analcime, clinoptilolite, chabazite, and erionite, though not limited to those mentioned. The exemplified zeolites have the following ion-exchange capacities: 7 meq/g for the A-type zeolite, 6.4 meq/g for the X-type zeolite, 5 meq/g for the Y-type zeolite, 3.4 meq/g for the T-type zeolite, 11.5 meq/g for the sodalite, 2.6 meq/g for the mordenite, 5 meq/g for the analcime, 2.6 meq/g for the clinoptilolite, 5 meq/g for the chabazite, and 3.8 meq/g for the erionite. These ion-exchange capacities are sufficient for ensuring ion exchange with an antibacterial ion such as an ammonium ion or silver ion. The antibacterial ion may be a silver ion, copper ion, zinc ion, bismuth ion, tin ion or thallium ion; it is preferably the silver ion, copper ion or zinc ion.

In view of the antibacterial property, it is preferable that the zeolite should contain 0.1 to 15% of an antibacterial ion. It is more preferable that the antibacterial zeolite should contain 0.1 to 15% of the silver ion or 0.1 to 18% of the copper ion or zinc ion. In consideration of effectively preventing the discoloration of a resin containing the zeolite, the proper amount of the ammonium ion contained in the zeolite is 0.5 to 5%, preferably 0.5 to 2%. In this specification, "%" means the weight % with 110° C. being the reference drying temperature.

The following will describe how to fabricate a antibacterial zeolite.

The antibacterial zeolite used in this invention can be provided by rendering a zeolite to contact a mixed solution containing a preadjusted antibacterial ion, such as a silver ion, copper ion or zinc ion, and an ammonium ion, to thereby exchange the exchangeable ion in the zeolite with the former ions. The contact is performed under a temperature of 10° to 70° C., preferably 40° to 60° C., for 3 to 24 hours, more preferably for 10 to 24 hours, using the batch operation or continuous operation (e.g., column operation). The mixed solution should have its pH controlled to be 3 to 10, and preferably 5 to 7, as such control can prevent precipitation of a silver oxide or the like into the surface or pores of the zeolite. Each ion in the mixed solution is normally supplied as a salt. For instance, the silver ion may be supplied using a silver nitrate, silver sulfate, silver perchlorate, silver acetate, diamine silver nitrate or diamine silver sulfate, the copper ion may be supplied using a copper nitrate (II), copper sulfate, copper perchlorate, copper acetate or potassium tetracyanocuprate, the zinc ion may be supplied using a zinc nitrate (II) or zinc sulfate, the bismuth ion may be supplied using a bismuth chloride or bismuth iodide, and the thallium ion may be supplied using a thallium perchlorate, thallium sulfate, thallium nitrate or thallium acetate.

The amount of the silver ion, etc. in the zeolite can be properly controlled by adjusting the density of each ion (salt) in the mixed solution. In a case where the antibacterial zeolite contains the ammonium ion and silver ion, for instance, this antibacterial zeolite will properly contain 0.5 to 5% of the ammonium ion and 0.1 to 15% of the silver ion by adjusting the ammonium ion density and the silver ion density in the mixed solution to be 0.2 M/l to 2.5 M/l and 0.002 M/l to 0.45 M/l, respectively. In a case where the antibacterial zeolite further contains the copper ion and zinc ion, for instance, this antibacterial zeolite will properly contain 0.1 to 18% of the copper ion and 0.1 to 18% of the zinc ion by adjusting the copper ion density and the zinc ion density in the mixed solution to be 0.1 M/l to 2.3 M/l and 0.15 M/l to 2.8 M/l, respectively.

The ion exchange may also be performed by using solutions containing the respective ions, instead of the aforementioned mixed solution, and causing the zeolite to properly contact the individual solutions. The ion density in each solution can be determined in conformity to the associated ion density in the mixed solution.

The zeolite having undergone the ion exchange is dried after sufficiently cleaned by water. To prevent water contained in the antibacterial zeolite from being evaporated at the time of providing a resin molded article to cause forming in the molded article or resin deterioration, it is desirable that the zeolite having undergone the ion exchange should be dried at the molding temperature of the organic polymer layer containing the antibacterial zeolite under a condition in which no water is evaporated from the zeolite. For instance, it is preferable that the drying is performed so that the remaining water in the zeolite becomes 4% or below. Such drying may properly be performed at 105° to 400° C. under the normal pressure or 50° to 250° under a reduced pressure (about 1 to 30 Torr).

In order to provide a sterilized cooking board having a high antimicrobial activity, the antibacterial zeolite used in this invention should have an average particle diameter of 6 μm or below, preferably 0.3 to 4 μm. The organic polymer for the organic polymer layer used for the present sterilized cooking board may be an ionomer resin, EEA resin, EVA resin, polyvinyl chloride, chlorinated polyethylene, fluoride resin, polyamide resin, thermoplastic polyurethane elastomer, polyether ether ketone resin, polysulfone, high density polyethylene, low density polyethylene, liner low density polyethylene, polycarbonate, butadiene resin, polypropylene, styren type special transparent resin, polyacrylate, reinforced polyethylene terephthalate, polystyrene, vinylidene chloride resin or electroconductive resin (e.g., Shostat, a product of SHOWA DENKO K.K.). In view of the hardness, whiteness and permanence stability, polyethylene such as the high density polyethylene, low density polyethylene or liner low density polyethylene is preferable.

The organic polymer layer used in this invention will now be described.

The organic polymer layer used in the present sterilized cooking board can be provided by molding a mixture attained by mixing the antibacterial zeolite and the organic high-molecular compound by the normal method.

The molding method may be injection molding, extrusion molding, blow molding, calender molding, or glue molding. The calender molding, for example, is a method for rolling a thermoplastic resin between two heated rolls to provide a sheet-like molded article. Upheavals on the surfaces of the molded article can be easily formed by engraving such upheavals on the surfaces of the rolls.

In order to keep a sterilized state on any part of a cut made on the present sterilized cooking board in use by a knife or the like and ensure economically effective use of the antibacterial zeolite, it is preferable that the organic polymer layer used in this invention have a thickness of 3 mm or above, preferably 5 to 10 mm. Further, it is preferable to mix 1 to 400 mg, preferably 2 to 100 mg, of the antibacterial zeolite per 1 $m^2$ of the organic polymer layer in order to stably keep the sterilized state.

Although the present sterilized cooking board fabricated in the above manner has the organic polymer layer containing the antibacterial zeolite laminated on an intermediate resin layer, it may take a single layer structure. Further, conventional materials may be used as for the intermediate resin layer. This resin layer may be processed to be lighter as a forming member or to enhance the mechanical strength as a glass fiber enforced member, or a pigment may be added to the resin layer to provide a colorful cooking board in blue, pink, etc.

The thickness of the intermediate layer used in this invention may vary depending on the use of the present sterilized cooking board and constituting materials; for example, it is set to be 5 to 150 mm.

Known conventional methods such as the thermally melting pressure boding method, coextrusion method and gluing method can all be applied as a method for laminating the layer containing the antibacterial zeolite on the intermediate layer in the present sterilized cooking board.

As the present sterilized cooking board has upheavals formed on its surfaces, the sterilization lasting force can be provided more effectively. In view of increasing the sterilization lasting force, the proper area of the upheavals is 120% or more, preferably 150% or more, of the area of the board's surfaces when they are flat. Making the upheavals 0.05 to 3 mm high in the direction of the thickness of the cooking board causes the antibacterial zeolite to be more exposed and is most preferable when the board is used as a cooking board. Further, it is better that the upheavals be formed uniformly over the surfaces of the cooking board; the upheavals may be formed in a geometric pattern of about 1 to 3 mm. The upheavals may be formed on the surfaces of the present sterilized cooking board by using a method for pressing a thermally melt, molded article onto an emboss roll or a mat roll with an upheaval pattern provided by putting a mirror-finished roll to corrosion process or mechanical process.

The present invention will be described in more detail below referring to specific examples.

EXAMPLE OF ADJUSTING ANTIBACTERIAL ZEOLITE

In this invention two types of zeolites were used: A-type zeolite ($Na_2O.Al_2O_3.1.9SiO_2.XH_2O$: average particle size of 1.5 μm) and Y-type zeolite ($1.1Na_2O.Al_2O_3 4.0SiO_2.XH_2O$: average particle size of 0.7 μm) both available on the market. Four types of salts for individual ion exchanges were used: silver nitrate, copper nitrate, zinc nitrate and ammonium nitrate. Table 1 shows the types and densities of salts contained in an ion-exchange solution with respect to the types of zeolites used in adjusting each sample.

For each sample, water was added to 1 Kg of powder heated and dried at 110° C. to provide 1.3 l of slurry, then the slurry was stirred for deairing, and proper amounts of 0.5 N nitrate solution and water were added to the slurry to control its pH to be 5 to 7 to thereby provide 1.8 l of slurry in total. Then, 3 l of a solution of a predetermined salt having a predetermined density was added to the slurry for ion exchange and the resultant slurry had a total volume of 4.8 l. This slurry liquid was stirred to be in a uniform state for 10 to 48 hours while being kept at 40° to 60° C. After ion exchange, the zeolite phase was filtered and washed with water of a room temperature or warm water using excess silver ions, etc. in the zeolite phase until no more ion components could be detected. Then, data on the individual samples 1 to 4 heated and dried at 110° C. were acquired. The resultant data are as shown in Table 1.

FABRICATION EXAMPLE OF STERILIZED COOKING BOARD

The antibacterial zeolite attained in the manner described in the previous section, "Example of Adjusting Antibacterial Zeolite," was dried for 5 hours under predetermined drying conditions (amount of remaining water being 3.8% or less). A low density polyethylene (Nobatec F161, a product of MITSUBISHI CHEMICAL INDUSTRIES LTD.) was added to the dried antibacterial zeolite so that the amount of the antibacterial zeolite became 10 to 40 mg/m². The resultant layer together with an intermediate layer made only of a low density polyethylene and a layer further containing a antibacterial zeolite were molded by the coextrusion method. The mold is 900 mm long, 200 mm wide and 4+20+4 mm thick. The temperature for the molding was 260° C. Then, both surfaces of the molded article were embossed using emboss rolls each having a square pattern 1 mm long on each side and 0.05 to 3 mm deep formed on their respective surfaces. The resultant sterilized cooking board therefore had embossed surfaces.

Further, a sample containing no antibacterial zeolite (comparative example 1) and a sample containing a antibacterial zeolite but undergone no embossing (comparative example 2) were produced.

Figure 2:
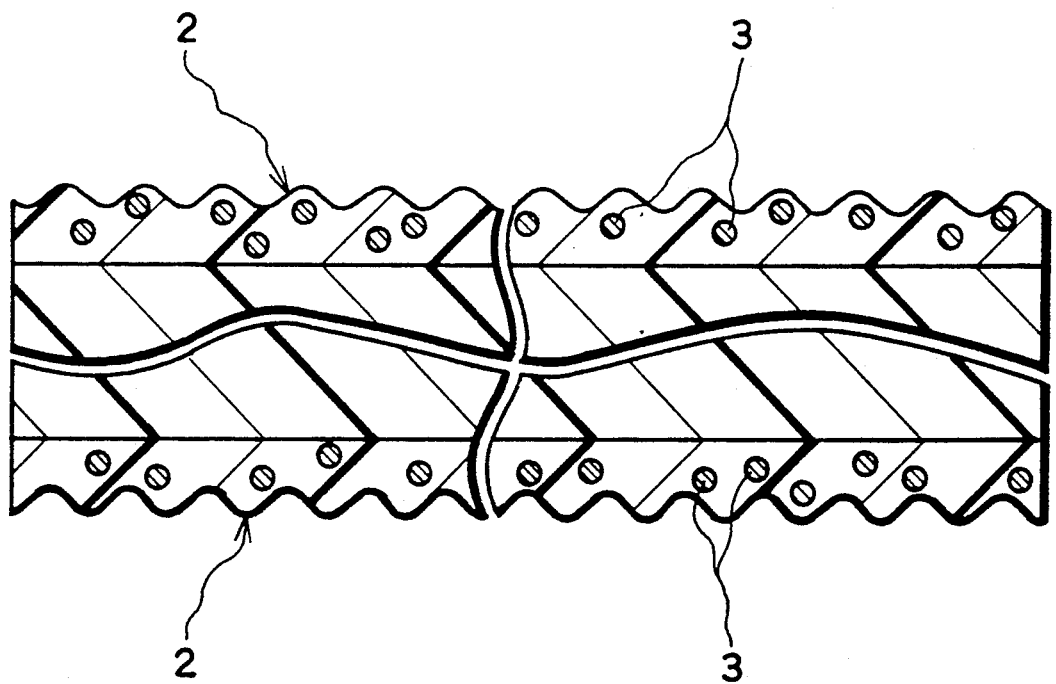
FIG. 2 is a cross sectional view of the sterilized cooking board taken along the line II—II in FIG. 1.

The sterilized cooking board obtained by the fabrication example has a shape as shown in FIGS. 1 and 2. Molding a sterilized cooking board 1 as shown in FIG. 1 can provide a board surface 2 containing a antibacterial zeolite 3 as shown in cross section in FIG. 2.

PRACTICAL BACTERIA TEST EXAMPLE

After using the sterilized cooking boards obtained by the fabrication example and comparative examples at home for one month, bacteria (salmonella, enteritis vibrio) existing on the surfaces of each board were measured using a stamp method. The results are shown in Table 2.

This invention may be practiced or embodied in still other ways without departing from the spirit or essential characteristic thereof. The preferred embodiment described in the foregoing description is therefore illustrative and not restrictive, and the scope of the invention is indicated by the appended claims and all variations which come within the meaning of the claims are intended to be embraced therein.

TABLE 1

| Sample No. | Zeolite Type | Amount Contained in Zeolite (%) | | | | Yield (g) | Composition in Mixed Solution (M/l) | | | | Solution pH | Ion Exchange (hr) |
|---|---|---|---|---|---|---|---|---|---|---|---|---|
| | | $NH_4$ | Ag | Cu | Zn | | $NH_4NO_3$ | $AgNO_3$ | $Cu(NO_3)_2$ | $Zn(NO_3)_2$ | | |
| 1 | A | — | 14.0 | — | 15.0 | 940 | — | 0.40 | — | 2.8 | 6.3 | 24 |
| 2 | A | 0.5 | 5.6 | 15.0 | — | 930 | 1.2 | 0.13 | 2.5 | — | 6.1 | 24 |
| 3 | Y | 2.0 | 3.6 | 6.0 | 3.2 | 930 | 1.8 | 0.10 | 1.5 | 1.2 | 5.8 | 24 |
| 4 | Y | 5.0 | 8.2 | — | — | 910 | 2.3 | 0.25 | — | — | 5.3 | 24 |

TABLE 2

| Experiment No. | Antibacterial Zeolite No. | Embossing Yes/No | Number of Bacteria on Cooking Board (no./cm²) | |
|---|---|---|---|---|
| | | | Salmonella | Enteritis Vibrio |
| Example 1 | 1 | Yes | 0 | 0 |
| Example 2 | 2 | Yes | 0 | 0 |
| Example 3 | 3 | Yes | 0 | 0 |
| Example 4 | 4 | Yes | 0 | 0 |
| Comparative Example 1 | — | Yes | $8 \times 10^2$ | $5 \times 10^4$ |
| Comparative Example 2 | 2 | No | | $6 \times 10$ |

What is claimed is:

1. A food cutting board comprising a core having an outer layer on at least one surface, said outer layer comprising an organic polymer containing an antibacterial Zeolite, said outer layer having a thickness of at least 3 mm and an exposed surface having a rugose finish, thereby providing a non-slip surface having an increased area for exposure of said antibacterial Zeolite during use.

2. The food cutting board according to claim 1, wherein said outer layer has a surface area at least 120 percent greater than that of said core.

3. The food cutting board according to claim 1, wherein the depth of the ridges in said rugose finish is between 0.05 to 3 mm.

4. The food cutting board according to claim 1, wherein said organic polymer is polyethylene.

* * * * *